(12) United States Patent
Rudrapatna et al.

(10) Patent No.: US 11,022,308 B2
(45) Date of Patent: Jun. 1, 2021

(54) DOUBLE WALL COMBUSTORS WITH STRAIN ISOLATED INSERTS

(71) Applicant: HONEYWELL INTERNATIONAL INC., Morris Plains, NJ (US)

(72) Inventors: Nagaraja S. Rudrapatna, Chandler, AZ (US); Ian Critchley, Prescott, AZ (US); Jeffrey Spencer, Tempe, AZ (US); Philip Smalley, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 578 days.

(21) Appl. No.: 15/993,986

(22) Filed: May 31, 2018

(65) Prior Publication Data

US 2019/0368736 A1 Dec. 5, 2019

(51) Int. Cl.
*F23R 3/06* (2006.01)
*F23R 3/00* (2006.01)
*F23R 3/50* (2006.01)

(52) U.S. Cl.
CPC ............... *F23R 3/06* (2013.01); *F23R 3/002* (2013.01); *F23R 3/50* (2013.01); *F23R 2900/00017* (2013.01); *F23R 2900/03041* (2013.01)

(58) Field of Classification Search
CPC .... F23R 3/04; F23R 3/06; F23R 3/002; F23R 3/50; F23R 2900/03041
See application file for complete search history.

(56) References Cited

U.S. PATENT DOCUMENTS

| 3,545,202 | A | * | 12/1970 | Batt | .......................... | F23R 3/06 |
| | | | | | | 60/757 |
| 4,132,066 | A | | 1/1979 | Austin, Jr. et al. | | |
| 4,302,941 | A | | 12/1981 | DuBell | | |
| 4,527,397 | A | | 7/1985 | Tobery et al. | | |
| 4,695,247 | A | | 9/1987 | Enzaki et al. | | |
| 4,700,544 | A | | 10/1987 | Fucci | | |
| 4,805,397 | A | * | 2/1989 | Barbier | ..................... | F23R 3/06 |
| | | | | | | 60/800 |
| 4,875,339 | A | | 10/1989 | Rasmussen et al. | | |
| 7,000,396 | B1 | | 2/2006 | Storey | | |
| 7,101,173 | B2 | * | 9/2006 | Hernandez | .............. | F02C 7/266 |
| | | | | | | 239/533.12 |
| 8,161,752 | B2 | | 4/2012 | Yankowich et al. | | |
| 9,010,123 | B2 | | 4/2015 | Rudrapatna et al. | | |

(Continued)

FOREIGN PATENT DOCUMENTS

GB 2017827 A 10/1979

*Primary Examiner* — Steven M Sutherland
(74) *Attorney, Agent, or Firm* — Lorenz & Kopf, LLP (57) ABSTRACT

A combustor for a turbine engine includes a first liner and a second liner forming a combustion chamber with the first liner. The combustion chamber is configured to receive an air-fuel mixture for combustion therein. The first liner is a first double wall liner with a first wall forming a portion of the combustion chamber and a second wall extending around at least a portion of the first wall to form a liner cavity with the first wall. The first wall defines a first wall orifice and the second wall defines a second wall orifice. The combustor further includes a first insert mounted on the second wall within the second wall orifice and extending through the first wall orifice. The first insert is configured to direct a first air jet through the second wall, through the first wall, and into the combustion chamber.

18 Claims, 8 Drawing Sheets

(56) References Cited

U.S. PATENT DOCUMENTS

| | | |
|---|---|---|
| 9,038,395 B2 | 5/2015 | Rudrapatna et al. |
| 9,038,995 B2 | 5/2015 | Kojima |
| 9,062,884 B2 | 6/2015 | Rudrapatna et al. |
| 9,200,808 B2 | 12/2015 | Romig et al. |
| 10,443,848 B2 * | 10/2019 | Cunha .................... F23R 3/06 |
| 2013/0152591 A1 | 6/2013 | Dery et al. |
| 2013/0255265 A1 | 10/2013 | Rudrapatna et al. |
| 2015/0338101 A1 | 11/2015 | Parsania et al. |
| 2016/0209035 A1 | 7/2016 | Cramer |
| 2016/0327271 A1 | 11/2016 | Sandoval |
| 2017/0159454 A1 | 6/2017 | Spangler et al. |
| 2017/0159455 A1 | 6/2017 | Spangler et al. |
| 2017/0159456 A1 | 6/2017 | Spangler et al. |
| 2017/0167730 A1 * | 6/2017 | Heinze .................... F23M 5/04 |

\* cited by examiner

DOUBLE WALL COMBUSTORS WITH STRAIN ISOLATED INSERTS

STATEMENT REGARDING FEDERALLY SPONSORED RESEARCH OR DEVELOPMENT

This invention was made with Government support under W911W6-16-2-0012 awarded by the United States Army, Army Contracting Command. The Government has certain rights in the invention.

TECHNICAL FIELD

The following discussion generally relates to gas turbine engine combustors, and more particularly, to double wall combustors with strain isolated inserts and methods for installing the same.

BACKGROUND

Gas turbine engines, such as those used to power modern commercial aircraft, typically include sections within one or more compressors for pressurizing a supply of air, a combustor for burning fuel in the presence of the pressurized air, and one or more turbines for extracting energy from the resultant combustion gases. The combustor typically includes radially spaced apart inner and outer liners defining an annular combustion chamber between the compressor and the turbine. A number of circumferentially distributed fuel injectors typically project into the forward end of the combustion chamber to supply the fuel to the combustion chamber, and one or more rows of circumferentially distributed air admission holes or orifices in the liners admit air into the combustion chamber for combustion.

Modern combustors generally attempt to operate at very high temperatures, to achieve high operability, and to produce relatively low gaseous pollutant emissions during combustion, particularly oxides of nitrogen (NOx). One type of combustor that may provide one or more of these advantages is a rich burn, quick quench, lean burn (RQL) combustor, which includes the following three serially-arranged combustion zones: a rich burn zone at the forward end of the combustor, a quench or dilution zone downstream of the rich burn zone, and a lean burn zone downstream of the quench zone. By precisely controlling the stoichiometries between the air and fuel in each zone, high-temperature excursions may be reduced and the resulting NOx emissions can be minimized. The design and development of the quench zone geometry is commonly one of the primary challenges in the successful implementation of low-emissions RQL combustors. However, at times, designs that provide desired quench zone characteristics may adversely impact cooling schemes for the combustor components.

Accordingly, it is desirable to provide combustors with a geometry that promotes low emissions and increased operability while maintaining adequate cooling for the combustor components. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for a turbine engine includes a first liner and a second liner forming a combustion chamber with the first liner. The combustion chamber is configured to receive an air-fuel mixture for combustion therein. The first liner is a first double wall liner with a first wall forming a portion of the combustion chamber and a second wall extending around at least a portion of the first wall to form a liner cavity with the first wall. The first wall defines a first wall orifice and the second wall defines a second wall orifice. The combustor further includes a first insert mounted on the second wall within the second wall orifice and extending through the first wall orifice. The first insert is configured to direct a first air jet through the second wall, through the first wall, and into the combustion chamber.

In accordance with another exemplary embodiment, a method is provided for installing an insert in a combustor liner, the insert including an inlet portion, a body portion, and a shoulder extending around the body portion. The combustor liner is a first double wall liner with a first wall with a first side forming a portion of a combustion chamber and a second side facing a liner cavity and a second wall extending around at least a portion of the first wall and having a first side forming the liner cavity with the first wall and a second side facing a combustor plenum. The first wall defines a first wall orifice and the second wall defines a second wall orifice. The method includes the steps of: inserting the inlet portion through the first wall orifice from the first side of the first wall and then through the liner cavity and the second wall orifice of the second wall until the shoulder abuts the first side of the second wall; and deforming the inlet portion such that the inlet portion has an outer diameter greater than a diameter of the second wall orifice.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Exemplary embodiments described herein provide a combustor having double wall liners with inserts to guide pressurized air through the liners and into the combustion chamber. During installation, each insert generally includes a tubular body portion that is inserted from the hot wall through the liner until a shoulder circumscribing the body portion abuts the cold wall within the liner cavity. A tool may deform an inlet portion projecting through the cold wall to form a flared inlet portion. The flared inlet portion and shoulder may capture the cold wall to retain the insert on the liner without welding or other bonding techniques. A flange may be provided on an outlet portion of the insert on the combustor chamber side. An axial passage is formed between the outer circumference of the insert and the edge of the hot wall orifice, and a radial passage is formed between the surface of the hot wall and the flange, such that during operation cooling air may flow from the liner cavity, through the hot wall via the axial passage, and through the radial passage to form a radiating shroud of cooling air around the insert on the hot wall within the combustion chamber. As such, the passages provide strain isolation between the hot and cold walls and cooling of the insert and surrounding areas.

Figure 1:
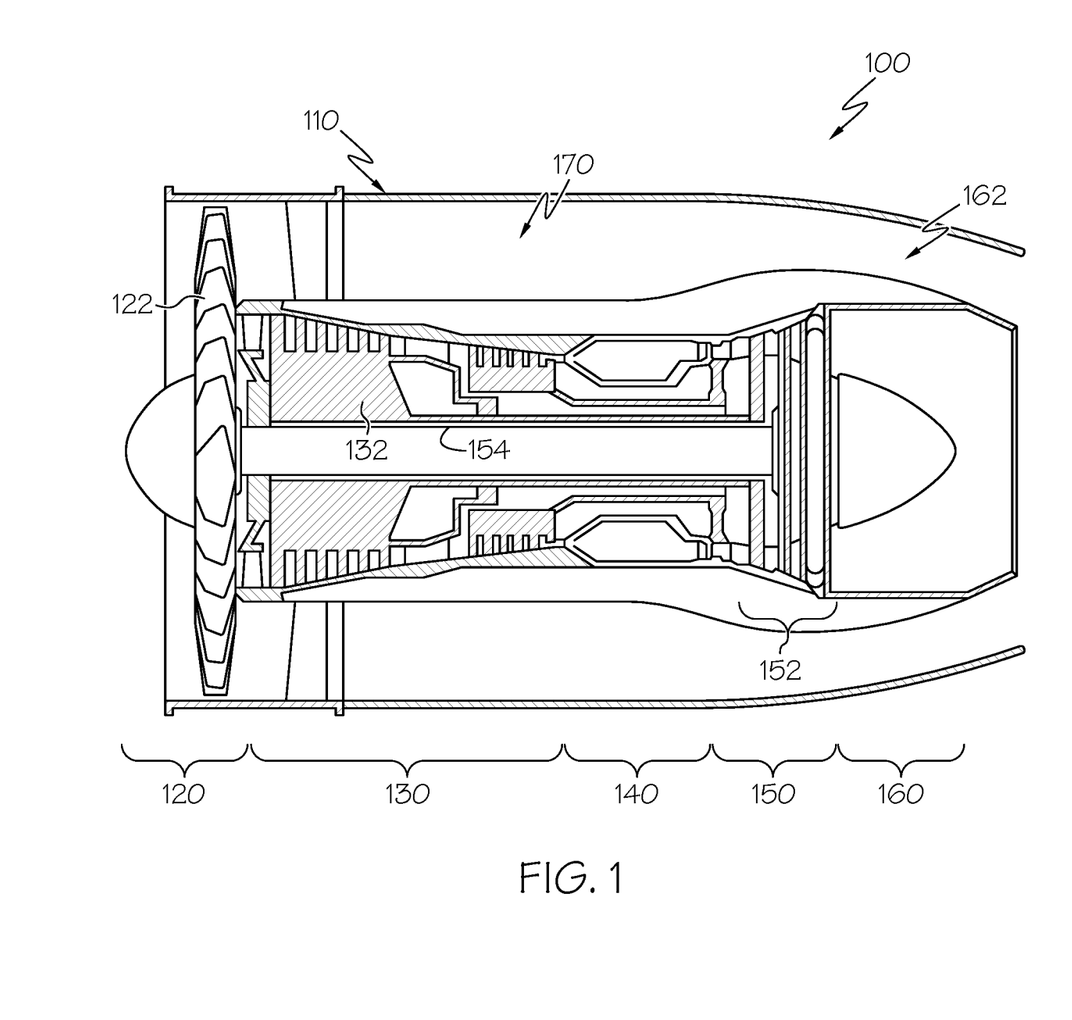
FIG. 1 is a cross-sectional view of a gas turbine engine according to an exemplary embodiment.

FIG. 1 is a simplified, cross-sectional view of a gas turbine engine 100 according to an exemplary embodiment. The engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132 that raise the pressure of the air directed from the fan 122. The compressors 132 then direct the compressed air into the combustion section 140. In the combustion section 140, the high pressure air is mixed with fuel and combusted. The combusted air is then directed into the turbine section 150.

The turbine section 150 may include a series of turbines 152, which may be disposed in axial flow series. The combusted air from the combustion section 140 expands through and rotates the turbines 152 prior to being exhausted through a propulsion nozzle 162 disposed in the exhaust section 160. In one embodiment, the turbines 152 rotate to drive equipment in the engine 100 via concentrically disposed shafts or spools. Specifically, the turbines 152 may drive the compressor 132 via one or more rotors 154.

Figure 2:
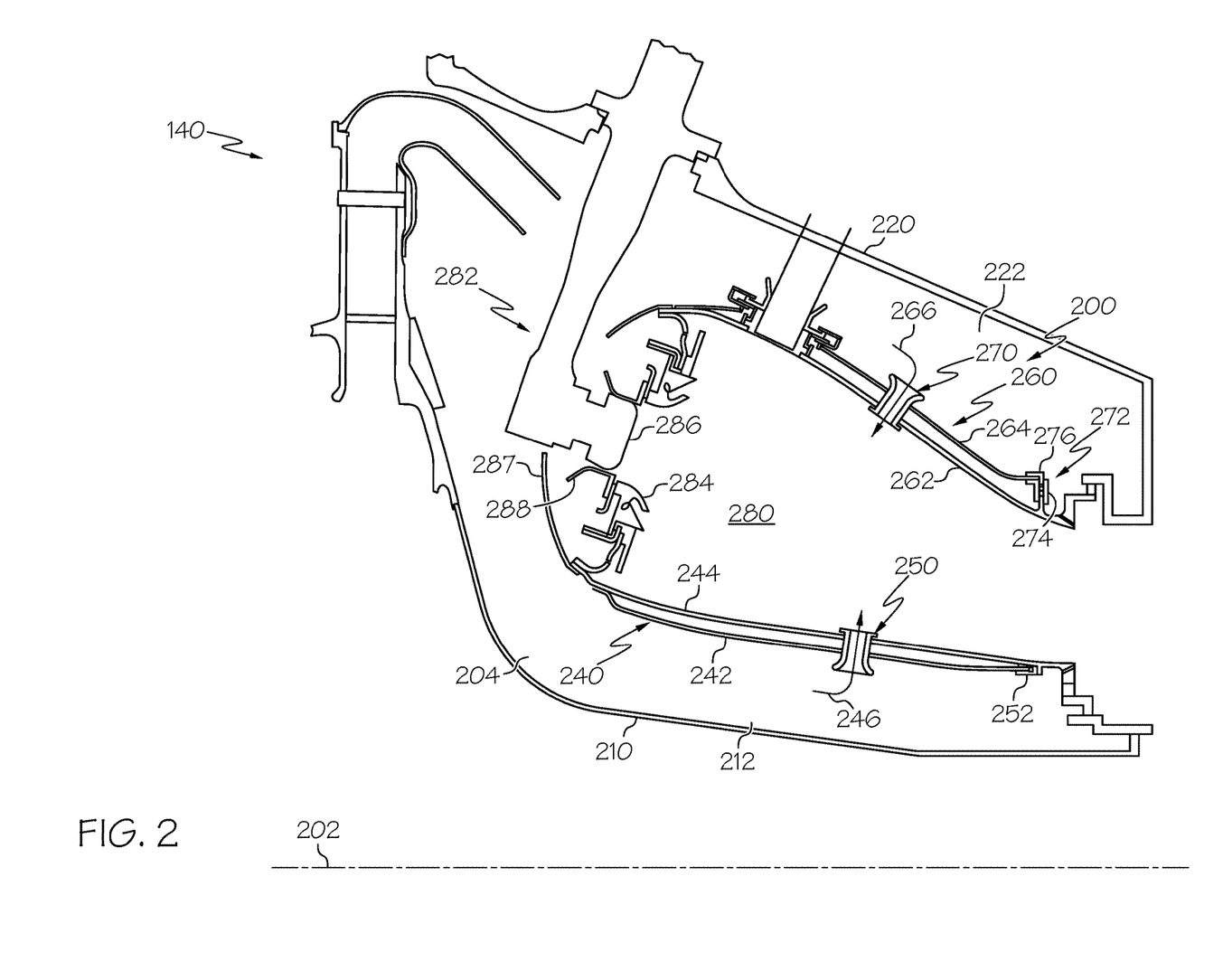
FIG. 2 is a partial, cross-sectional side elevation view of the combustor section of FIG. 1 in accordance with an exemplary embodiment.

FIG. 2 is a more detailed cross-sectional view of a combustor 200 that may be implemented in the combustion section 140 of FIG. 1. In FIG. 2, only half the cross-sectional view is shown; the other half would be substantially rotationally symmetric about a centerline and axis of rotation 202. Although the combustion section 140 of FIG. 2 is annular, aspects of exemplary embodiments described herein may also be useful in can combustors, can-annular combustors, and other types of combustors. Moreover, exemplary embodiments may find beneficial uses in many industries, including aerospace and particularly in high performance aircraft, as well as automotive and electrical generation.

The combustion section 140 includes a radial inner case 210 and a radial outer case 220 concentrically arranged with respect to the inner case 210. The inner and outer cases 210, 220 circumscribe an axially-extending engine centerline 202 to define an annular pressure vessel 204. In the context of FIG. 2, the terms "axial" and "radial" refer to annular dimensions relative to the centerline 202 of the combustion section 140 in which the axial dimension is parallel to the centerline 202 and the radial dimension is perpendicular to the centerline 202.

The combustor 200 is arranged within the inner and outer cases 210, 220 and is formed by an inner liner 240 and an outer liner 260 to define an annular combustion chamber 280. The liners 240, 260 cooperate with cases 210, 220 to define respective outer and inner air plenums 212, 222.

The inner liner 240 shown in FIG. 2 is a dual or double wall liner with a "cold" wall 242 on the side of the inner plenum 212 and "hot" wall 244 on the side of the combustion chamber 280. The cold and hot and cold walls 242, 244 of the inner liner 240 each respectively define an orifice though which a jet 246 flows into the combustion chamber 280. An insert 250 is mounted in the orifices of the cold and hot walls 242, 244 and assists in guiding the jet 246 from the plenum 212, through both walls 242, 244, and into the combustion chamber 280.

The downstream ends of the walls 242, 244 are coupled together in a manner that accommodates some amount of relative movement, e.g., such as a result of thermal strain. For example, a coupling assembly 252 is provided and includes generally radial and axial flanges. The radial flange of the coupling assembly 252 is received in a radial groove formed in the downstream end of the hot wall 244. The axial flange of the coupling assembly 252 forms an axial groove with the hot wall 244 that receives the downstream end of the cold wall 242. In this manner, axial movement and radial movement between the walls 242, 244 may be accommodated.

Similar to the inner liner 240, the outer liner 260 shown is a dual or double wall liner with a "hot" wall 262 on the side of the combustion chamber 280 and a "cold" wall 264 on the side of the plenum 222. The hot and cold walls 262, 264 each respectively define an orifice though which a jet 266 flows into the combustion chamber 280. An insert 270 is mounted in the orifices of the hot and cold walls 262, 264 and assists in guiding the jet 266 from the plenum 222, through both walls 262, 264, and into the combustion chamber 280.

The downstream ends of the walls 262, 264 are coupled together in a manner that accommodates some amount of relative movement, e.g., such as a result of thermal strain. For example, a coupling assembly 272 is provided. The coupling assembly 272 includes a first coupling member 274 forming inner and outer radial grooves and an axial flange and a second coupling member 276 with perpendicular axial and radial flanges. The downstream end of the hot wall 262 has a radial flange that is received in the inner radial groove of the first coupling member 274, and the radial flange of the second coupling member 276 is received in the outer radial groove of the first coupling member 274. The axial flange of the second coupling member 276 and the axial flange of the first coupling member 274 form a groove to receive the downstream end of the cold wall 264. In this manner, axial movement and radial movement between the walls 262, 264 may be accommodated.

The jets 246, 266 may be considered primary jets that support combustion. Additional jets, arranged in multiple axially and circumferentially displaced locations, may be provided with additional orifices and inserts. The liners 240, 260 and inserts 250, 270 will be discussed in greater detail below after a discussion of other components of the combustor 200 and an overview of the combustion process.

The combustor 200 suitably includes a front end assembly 282 having a swirler 284, fuel injector 286, a shroud 287, and fuel injector guide 288. The shroud 287 extends between and is secured to the forward-most ends of the inner and outer liners 240, 260. The shroud 287 accommodates the fuel injector 286 and introduces air into the forward end of the combustion chamber 280. The fuel injector 286 and swirler 284 introduce a swirling, intimately blended fuel-air mixture that supports combustion in the combustion chamber 280. One swirler 284, one fuel injector 286 and one fuel injector guide 288 are shown in the partial cross-sectional view of FIG. 2, but it will be appreciated that the combustor 200 is typically implemented with a number of circumferentially distributed swirlers 284, fuel injectors 286 and guides 288.

The depicted combustor 200 is a rich burn, quick quench, lean burn (RQL) combustor. During operation, a portion of pressurized air enters a rich burn zone of the combustion chamber 280 by way of passages in the front end assembly 282. This air intermixes with a stoichiometrically-excessive quantity of fuel introduced through the fuel injector 286 to support initial combustion in the rich burn zone. The rich stoichiometry of the fuel-air mixture in the rich burn zone produces a relatively cool, oxygen-deprived flame, thus preventing excessive NOx formation and guarding against blowout of the combustion flame during any abrupt reduction in engine power.

The combustion products from the rich burn zone, which include unburned fuel, then enter a quench zone. As noted above, jets 246, 266 flow from the plenums 212, 222, through the orifices in the inner and outer liners 240, 260, and into the quench zone. The jets 246, 266 are referred to as quench air because they rapidly mix the combustion products from a stoichiometrically rich state at the forward edge of the quench zone to a stoichiometrically lean state at, or just downstream of, the aft edge of the quench zone. The quench air rapidly mixes with the combustion products entering the quench zone to support further combustion and release additional energy from the fuel. Since thermal NOx formation is a strong time-at-temperature phenomenon, it is generally desirable that the fuel-rich mixture passing through the quench zone be mixed rapidly and thoroughly to a fuel-lean state in order to avoid excessive NOx generation. Thus the aerodynamic design and sizing of the zones, and the design of the quench air jet arrangement in an RQL combustor is important to the successful reduction of emissions levels and achievement of a desired combustor exit temperature distribution important to gas turbine component performance and durability. Finally, the combustion products from the quench zone enter a lean burn zone where the combustion process concludes.

Figure 3:
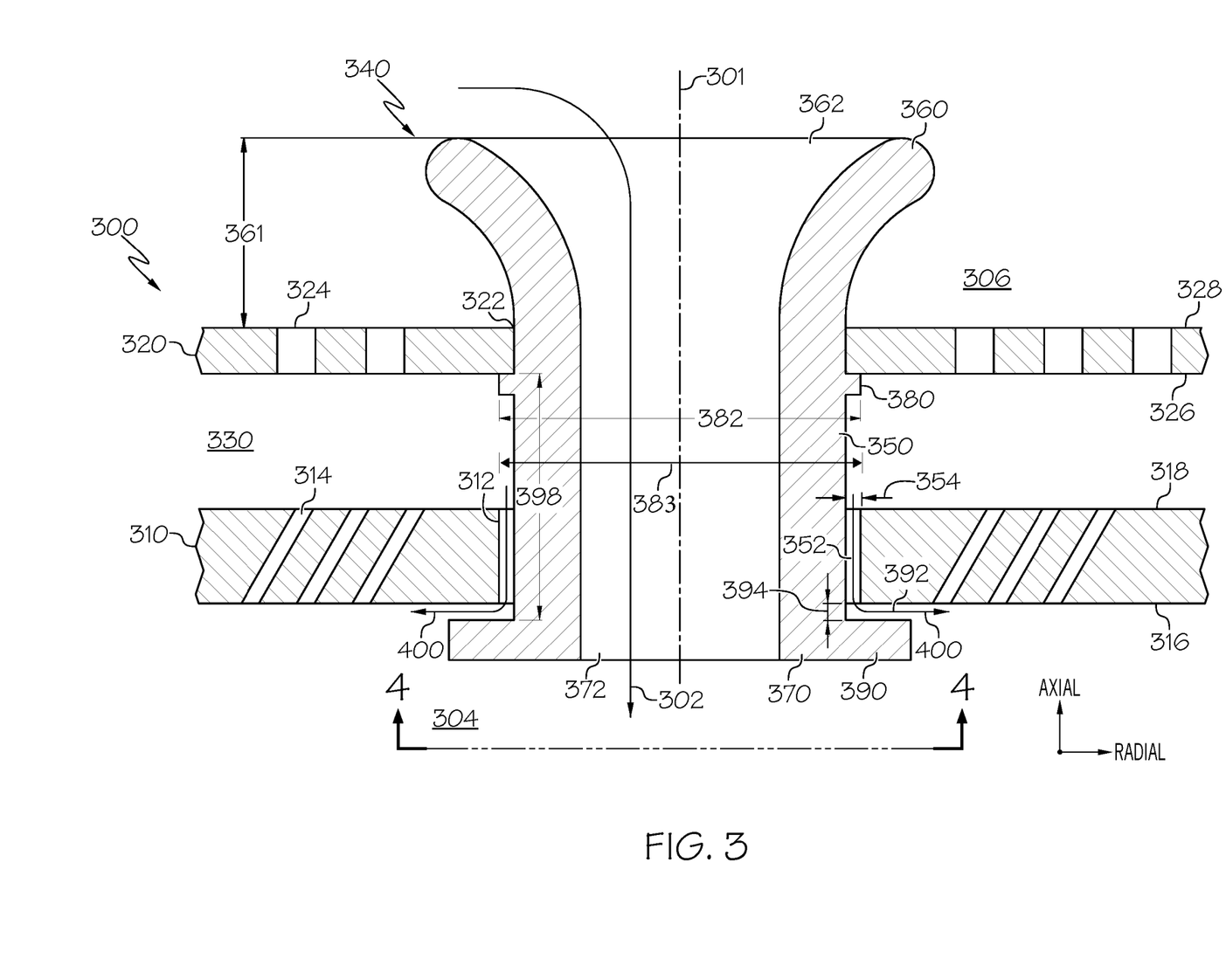
FIG. 3 is a partial enlarged portion of a combustor liner and an insert in accordance with an exemplary embodiment.

FIG. 3 is an enlarged partial cross-sectional view of a combustor, such as the combustor 200 of FIG. 2. FIG. 3 particularly depicts portions of a liner 300 with hot and cold walls 310, 320. As above, the cold wall 320 circumscribes the hot wall 310 and forms a liner cavity 330 in between. A combustion chamber 304 is on the hot wall side of the liner 300, and a plenum 306 is on the cold wall side of the liner 300.

The hot and cold walls 310, 320 of the liner 300 respectively define orifices (or air admission holes) 312, 322 into which an insert 340 is arranged. The insert 340 and liner 300 may correspond to the inserts 250, 270 and/or liners 240, 260 of FIG. 2. Moreover, embodiments discussed herein are applicable to any type of insert, liner, and/or combustor. Further, additional orifices and inserts with similar features and arrangements may be provided in both the inner and outer liners to provide additional quench jets to the combustion chamber.

As noted above, the liner 300 may be a double wall liner, particularly a double wall liner with impingement-effusion cooling. Specifically, the cold wall 320 may be an impingement baffle with a number of impingement cooling holes 324 that admit impingement jets of cooling air into the liner cavity 330 to strike the hot wall 310. The impingement cooling holes 324 are typically 90° to the surface of the cold wall 320, although other arrangements are possible. The hot wall 310 may be an effusion panel with a number of effusion cooling holes 314. The effusion cooling holes 314 are relatively small, closely spaced holes serving to direct a flow of cooling air through the hot wall 310. The effusion cooling holes 314 are typically angled at, for example, 15°-45° to the surface of the hot wall 310, and may be oriented to discharge at various angles relative to the bulk combustor gas flow, such that a film of cooling air forms on the hot wall 310.

The insert 340 is formed by a generally cylindrical or tubular body portion 350. In the context of FIG. 3, the terms "axial" and "radial" refer to annular dimensions relative to the centerline 301 of the insert 340 in which the axial dimension is parallel to the centerline 301 and the radial dimension is perpendicular to the centerline 301. In the embodiment shown in FIG. 3, the insert 340 is formed from a single, discrete piece relative to the liner 300.

As shown, the insert 340 extends through the orifice 322 of the cold wall 320, the liner cavity 330, and the orifice 312 of the hot wall 310. The hot wall 310 may be considered to include a first side 316 facing the combustion chamber 304 and a second side 318 facing the liner cavity 330, and the cold wall 320 may be considered to include a first side 326 facing the liner cavity 330 and a second side 328 facing the plenum 306. As introduced above and described in greater detail below, during operation, the insert 340 functions to direct a primary combustion jet (or air) 302 from the plenum 306 and through both walls 310, 320 of the liner 300 into the combustion chamber 304. The structural features of the insert 340 will be described below prior to a description of the functional characteristics and installation of the insert 340.

The body portion 350 of the insert 340 includes an inlet portion 360 defining an inlet 362 and an outlet portion 370 defining an outlet 372. The inlet portion 360 is positioned on the second side 328 of the cold wall 320 and is generally flared or has a bell-mouth to facilitate the flow of the jet 302 into the insert 340. The outlet portion 370 is positioned on the first side of the hot wall 310 to direct the jet 302 into the combustion chamber 304.

As noted above, the insert 340 has a geometric configuration to advantageously direct the jet 302 from the plenum 306, through the cold wall 320, though the hot wall 310, and into the combustion chamber 304. In some embodiments, the insert 340 may be configured to meter the jet 302 through the liner 300 with a portion having a constant inner diameter. Since the insert 340 extends through both walls 310, 320, the jet 302 may pass through the liner 300 with minimal pressure drop or interferences, e.g., even if the orifices 312, 322 become misaligned during operation.

The insert 340 is configured to engage the cold wall 320. In particular, the flared inlet portion 360 functions to secure the insert 340 in an axial direction (e.g., axially inward in FIG. 3). In other words, the inlet portion 360 may have a diameter greater than diameter of the orifice 322 to engage or abut the second side 328 of the cold wall 320, thereby preventing movement of the insert 340 toward the combustion chamber 304. The insert 340 includes a shoulder 380 that engages or abuts the first side 326 of the cold wall 320 to secure the insert 340 in the other axial direction (e.g., axially outward in FIG. 3). The shoulder 380 extends around the circumference of the cylindrical body portion 350 and has a diameter 382 greater than the diameter of the orifice 322 to prevent the insert 340 from movement toward the plenum 306. In one exemplary embodiment, the shoulder 380 may be contoured to locally match any contour of the cold wall 320. In some embodiments, the shoulder 380 may have the diameter 382 slightly less than or approximately equal to a diameter 383 of the orifice 312 in the hot wall 310 to facilitate installation, as described in greater detail below. In effect, the insert 340 "captures" the cold wall 320 between the flared inlet portion 360 and the shoulder 380. Given this configuration, the insert 340 generally does not require additional securement to the outer liner 300 in the form of bonding, welding and/or additional components. In one embodiment, such as that shown in FIG. 3, the shoulder 380 may have an outer diameter greater than the adjacent diameter of the body portion 350. In further embodiments, the shoulder 380 may be formed by a change in diameter between two sections of the body portion 350, e.g., as a step or shelf, as discussed in greater detail below.

In one embodiment, the body portion 350 has a diameter within the orifice 322 that generally matches the diameter of the orifice 322. For example, the body portion 350 of the insert 340 may be sized within the orifice 322 to minimize leakage between the insert 340 and the cold wall 320.

The insert 340 further includes a flange 390 that extends around the body portion 350 on the first side 316 of the hot wall 310. In the depicted embodiment, the flange 390 is arranged on the end of the insert 340 at the outlet portion 370. In some embodiments, the flange 390 may be contoured to locally match any contour of the hot wall 310.

The body portion 350 has an outer diameter that is smaller than the diameter of the orifice 312 such that an axial gap or passage 352 is formed between the outer circumference of the insert 340 and the hot wall 310. The width 354 of the passage 352 is determined by the difference between the outer diameter of the body portion 350 and the diameter of the orifice 312.

The flange 390 and the first side 316 of the hot wall 310 are separated from one another to form a radial gap or passage 392. The width 394 of the radial passage 392 (e.g., in the axial orientation) may be defined by the distance between the upper surface of the flange 390 and the first side 316 of the hot wall 310. Specifically, since the insert 340 is generally stationary with respect to the cold wall 320 as the shoulder 380 abuts the cold wall 320, in effect, the width 394 of the radial passage 392 is a function of the distance 398 between the upper surface of the flange 390 and the shoulder 380, as well as the depth of the liner cavity 330 and the thickness of the hot wall 310.

The axial passage 352 and radial passage 392 cooperate to provide additional cooling to the insert 340 and/or the first side 312 of the hot wall 310. In particular, cooling air 400 from the liner cavity 330 (e.g., originating as impingement cooling air through holes 324 in the cold wall 320) flows through the hot wall 310 via the axial passage 352 and is then redirected by the flange 390 through the radial passage 392. The radii, cross-sectional areas, and/or other dimensions of the passages 352, 392 may be any suitable dimensions with considerations for cooling requirements, combustion considerations, flow rates, and velocities. As described in greater detail below, the resulting radial flow provides a "showerhead" or shroud of cooling air flow around the circumference of the insert 340 within the combustion chamber 304.

Figure 4:
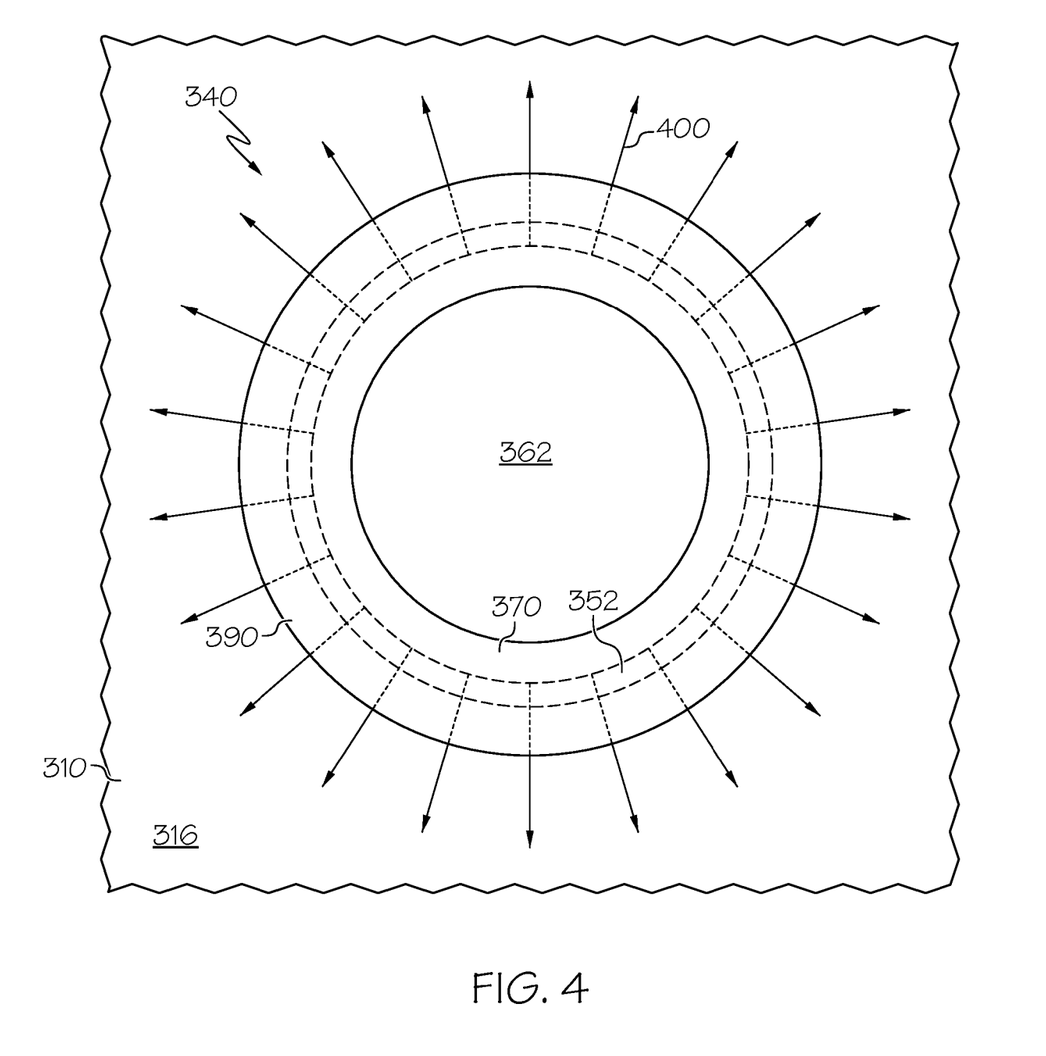
FIG. 4 is a partial cross-sectional view of FIG. 3 through line 4-4 in accordance with an exemplary embodiment.

FIG. 4 is a partial cross-sectional view of FIG. 3 through line 4-4 and depicts the outlet 372 of the insert 340 from the side of the combustion chamber 304. The view of FIG. 4 particularly depicts the radiating cooling flow 400 directed onto the first side 316 of the hot wall 310 of the liner 300. As previously noted, the cooling flow 400 flows from the axial passage 352 at the outlet portion 370 of the insert 340 and radially outward through radial passage 392 (FIG. 3), which in FIG. 4 is depicted in dashed lines until reaching the outer circumference of the flange 390. The shroud of radially extending air flow 400 improves cooling around the orifice 312 by supplementing the impingement-effusion cooling. In some instances, the cooling air flow 400 may at least partially buffer the outlet portion 370 of the insert 340 from the hot combustion gases of the combustion chamber without unduly interfering with impingement-effusion cooling of the liner 300, the combustion process, or the quench jets (e.g., jet 302).

Returning to FIG. 3, in some embodiments, the insert 340 enables the hot wall 310 and cold wall 320 to be strain isolated with respect to each other in axial and radial dimensions. For example, even though the insert 340 extends through both walls 310, 320 of the liner 300, the insert 340 is generally only mechanically connected to the cold wall 320, such that the insert 340 and cold wall 320 may have collective axial and radial movement relative to the hot wall 310. In particular, the axial passage 352 accommodates radial movement and enables axial movement, and the radial passage 392 accommodates axial movement and enables radial movement. As a result, the passages 352, 392 may provide dual functions: cooling air flow and strain isolation.

The insert 340 also enables sizing of the cavity 330 to optimize the impingement-effusion cooling. In particular, since the insert 340 extends through both walls 310, 320 (i.e., neither insert end is arranged within the cavity 330), the cavity 330 does not need to accommodate possible interferences between an insert end and a wall 310, 320 during operation.

As result of the flange 390, as well as by aerodynamic design, the outlet portion 370 protrudes past the hot wall 310 into the combustion chamber 304 to guide the jet 302 to a desired depth for advantageous quench characteristics. The outlet portion 370 may have an exit geometry configured to optimize jet characteristics into the combustion chamber 304 and to reduce variability in the exit angle.

The insert 340 may be manufactured from metallic or ceramic materials, although other materials may be used in various embodiments. The portions of the insert 340 positioned within the combustion chamber 304 may have a thermal barrier coating (TBC).

In one embodiment, the orifices 312, 322 and corresponding outer diameter of the body portion 350 of insert 340 are generally circular. However, the orifices 312, 322 and insert 340 may be modified as necessary or desired. For example, the orifices 312, 322 and insert 340 may be a non-circular shape, including rectangular, racetrack, oval, lobed, and square. Non-circular features on the outer diameter of the insert 340 and/or orifices 312, 322 may provide anti-rotation characteristics.

The dimensions of the insert 340 may vary as necessary or desired. For example, the outlet portion 370 may extend into the combustion chamber 304 to any suitable depth with considerations for desired jet penetration, impingement-effusion cooling impact, and/or characteristics of the radial passage 392. As noted above, the body portion 350 generally has an outer diameter that approximates the diameter of the orifice 322 in the cold wall 320 for a secure fit and leakage minimization, while being smaller than the diameter 383 of orifice 312 in the hot wall 310 to form the passage 352 and provide thermal isolation. In some embodiments, the body portion 350 may have a diameter smaller than the orifice 322. The inner diameter of the body portion 350 may depend on aerodynamic and other operational and installation characteristics. For example, the inner diameter may depend on the desired quantity of air passing into the combustion chamber 304. As also noted above, the shoulder 380 has the diameter 382 greater than the diameter of the cold wall orifice 322 and less than the diameter 383 of the hot wall orifice 312. The inlet portion 360 may have a height, diameter, and curvature for optimally guiding the jet 302 into the insert 340. Generally, the curvature is elliptical, i.e., with a changing radius of curvature. In other embodiments, the curvature may have a constant radius of curvature or have straight sections. In general, based on the configuration of the insert 340, the temperature profile of the combustion gases may be adjusted without compromising fuel-air mixing.

Some exemplary dimensions and/or design considerations will now be provided. As one example, the outer diameter of the shoulder 380 may be about 0.02 inches greater than the outer diameter of the body portion 350. In other embodiments, the outer diameter of the shoulder 380 may be approximately 10% greater than the outer diameter of the body portion 350. As a further example, the outer diameter of flange 390 may be about 0.2 inches greater than the outer diameter of the body portion 350, or about 100% greater. Further, the height 361 of the inlet portion 360 may be approximately 50% of the outer diameter of the body portion 350, and the height of the liner cavity 330 may be approximately 50% of the outer diameter of the body portion 350. The width 354 of the axial passage 352 may be approximately equal to the width 394 of the radial passage 392, while in other embodiments, the width 354 of the axial passage 352 may be less than the width 394 of the radial passage 392, such as approximately 60-90% or about 75%. The width 394 of the radial passage 392 may be approximately half the thickness of the hot wall 310 and/or about 20% of the depth of the liner cavity 330. The diameter of the hot wall orifice 312 may be approximately 0.04 inches or about 25% greater than the cold wall orifice 322.

Figure 5:
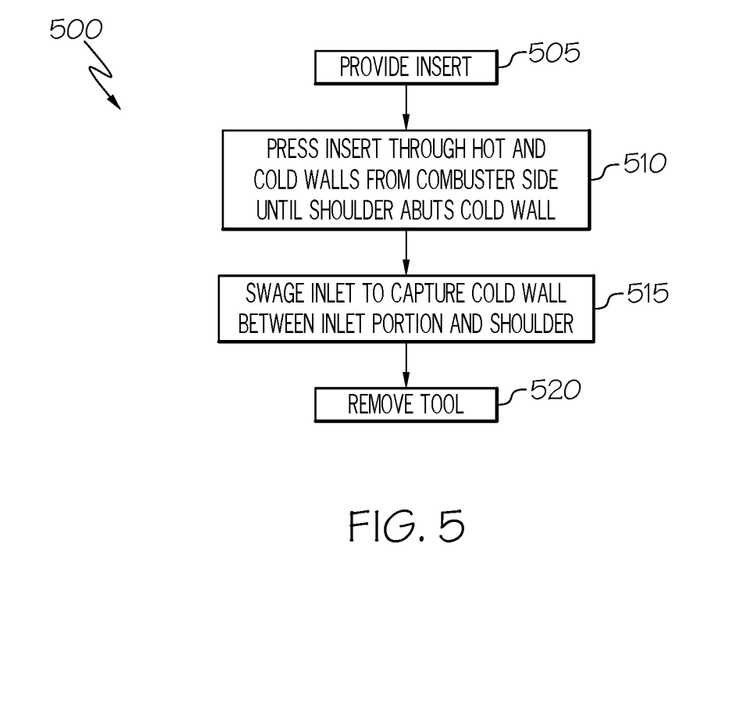
FIG. 5 is a flow chart of a method for installing an insert in a combustor liner in accordance with an exemplary embodiment.
Figure 6:
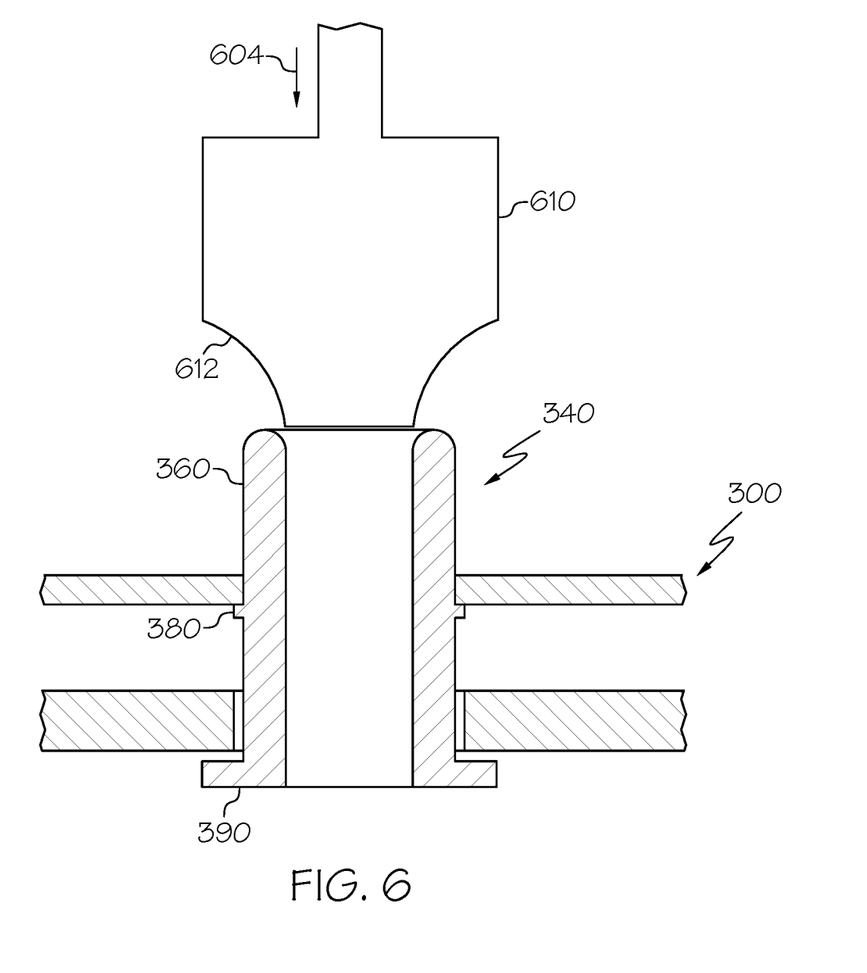
FIG. 6 is an enlarged portion of a combustor illustrating an installation step of the method of FIG. 5 in accordance with an exemplary embodiment.
Figure 7:
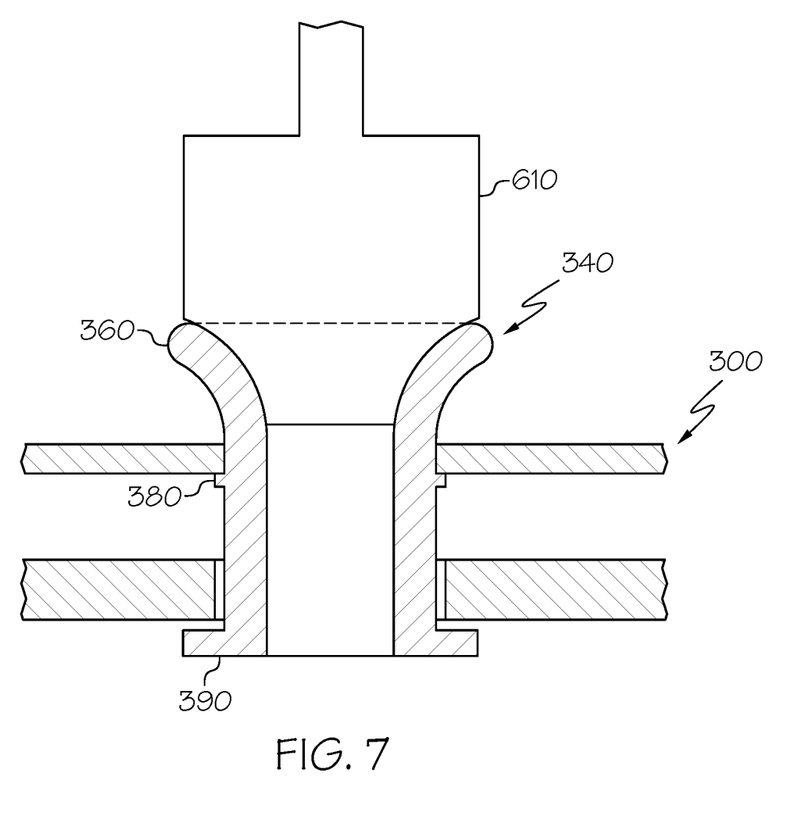
FIG. 7 is an enlarged portion of a combustor illustrating another installation step of the method of FIG. 5 in accordance with an exemplary embodiment.

FIG. 5 is a flow chart of a method 500 for installing an insert in a combustor liner, such as insert 340 in liner 300 described with reference to FIG. 3, in accordance with an exemplary embodiment, although the method 500 is applicable to inserts in any air admission hole of the inner or outer liner, such as described in reference to FIG. 2, as well as other configurations. FIGS. 6 and 7 depict installation steps of the method 500 and will be referenced in the description of FIG. 5 below.

In a first step 505 of the method 500, an insert 340 is provided. At this stage, the insert 340 is generally configured as depicted in FIG. 6 and includes a tubular body portion 350, a shoulder 380 circumscribing the body portion 350, and a flange 390 circumscribing the body portion 350 at one end. As also shown in FIG. 6, an inlet portion 360 of the insert 340 in this step 505 generally has a circumference equal to that of the body portion 350. In other words, the body portion 350 and the inlet portion 360 form a single tube shape with a generally constant diameter, although other configurations may be provided, including those described below with reference to FIG. 8.

In a second step 510, the inlet portion 360 is inserted through orifices in hot and cold walls 310, 320 from a first side 316 of the hot wall 310 until the shoulder 380 abuts the first side of the cold wall 320. As noted above, the shoulder 380 may have a diameter that is slightly smaller than the diameter of the orifice of the hot wall 310 to enable the insert 340 to pass through the orifice from the first side 316 of the hot wall 310 without obstruction until the shoulder 380 abuts the cold wall 320 within the liner cavity 330. In the position, the inlet portion 360 extends beyond the cold wall 320.

In a step 515, a working tool 610 is lowered in direction 604 to flare the inlet portion 360, as is particularly shown in FIG. 7. The working tool 610 may be lowered, for example, in a machine press (not shown). The working tool 610 has a contour 612 that matches the final geometry of the inlet portion 360, including the height, diameter, and curvature of the inlet portion 360. As such, the geometric configuration of the inlet portion 360 may be precisely controlled by the geometry of the working tool 610. Given the contour and controlled precision of the working tool 610, the deformation or flaring of the inlet portion 360 does not require a backing structure at the inlet portion 360 as a counter-force to the deformation. This results in an easier and simpler installation. A counter-press may be provided at any suitable location on the insert 340 to maintain the position of the insert 340 relative to the liner 300 as the working tool 610 deforms the inlet portion 360.

In step 520, the working tool 610 is then removed from the insert 340. As also noted above, the flared inlet portion 360 and shoulder 380 function to retain the insert 340 within the orifices of the liner 300 without welding to the outer liner and without damage to any coatings on the liner 300 or the liner 300 itself. This installation method 500 further provides a versatile insert design by accommodating different hole diameters, insert dimensions, and inlet portion profiles. The resulting configuration provides an insert 340 in a double wall combustor that enables enhanced durability and/or operation.

Although FIGS. 5 and 6 depict forming the flared inlet portion 360 with a single working tool 610, in other embodiments, more than one working tool may be used. For example, a first working tool 610 may partially flare the inlet portion 360 and a second working tool may be used to provide the final shape of the inlet portion 360.

Figure 8:
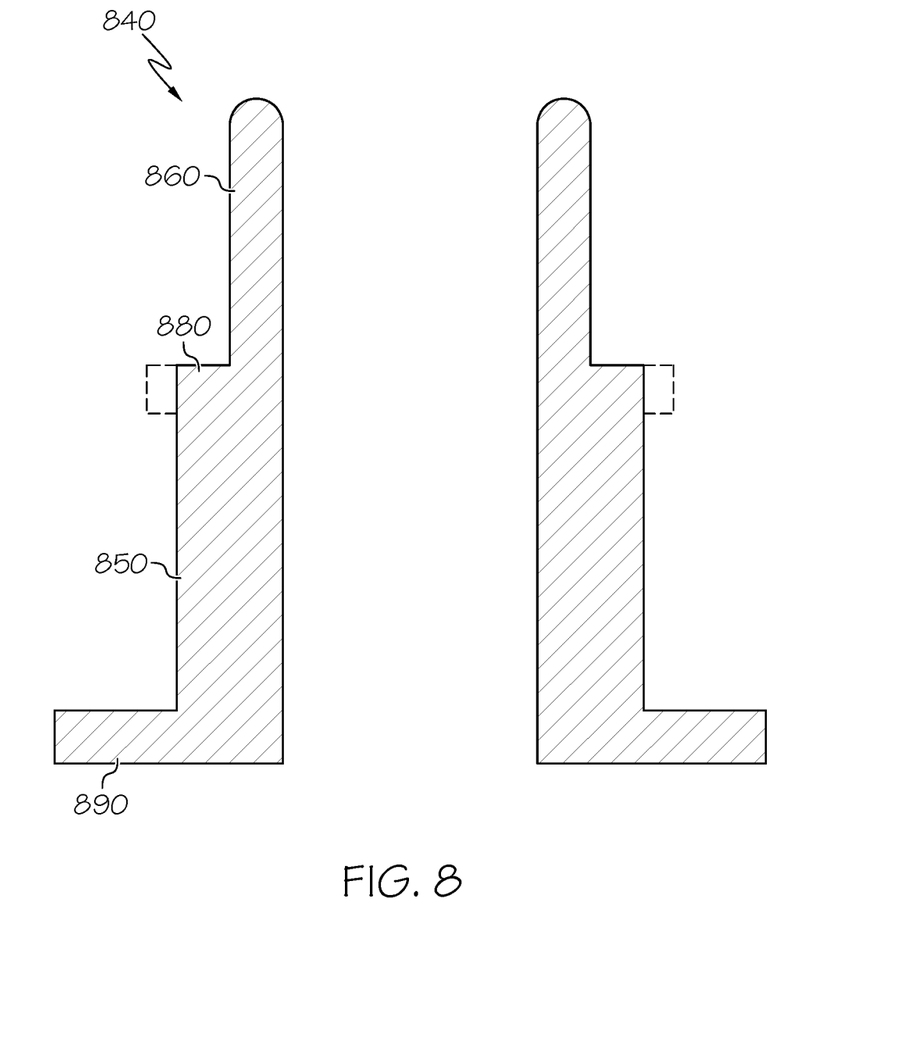
FIG. 8 is an example insert that may be used in the combustor of FIG. 3 prior to installation in accordance with an exemplary embodiment.

In the depicted embodiments of FIGS. 3, 6, and 7, the body portion 350 of the insert 340 has a generally constant outer diameter until swaging the inlet portion 360 to provide the bell mouth inlet 362 and capturing the cold wall 320 between the shoulder 380 and the swaged inlet portion 360. In other examples, the inlet portion, prior to swaging, may have a smaller initial outer diameter relative to the remaining body portion. An example is provided by the unswaged insert 840 depicted in FIG. 8. In FIG. 8, an insert 840 has an inlet portion 860 that has a smaller outer diameter relative to the outer diameter of body portion 850. As above, the boundary between the body portion 850 and the inlet portion 860 is a shoulder 880 that abuts the first surface of the cold wall 320. The flange 890 extends around the body portion at the other end of the insert 840. Upon swaging, the inlet portion 360 has a greater diameter than the cold wall orifice to secure the insert 840. The various corner edges may be blended and/or chamfered. Generally, the shoulder 880 may correspond to any change in diameter between the body portion 850 and the inlet portion 860 at the cold wall 320, typically a reduction in diameter that enables the inlet portion 860 to pass through the cold wall 320 and the shoulder 880 to abut of cold wall 320 within the liner cavity.

In other words, the shoulder 880 may be formed by the "shelf" or "step" on the body portion 850. In other embodiments, as indicated by the dashed lines in FIG. 8, the shoulder 880 may have an outer diameter greater than the body portion 850 remaining in the liner cavity. Generally, the body portion 850 and inlet portion 860 may have any suitable dimensions (e.g., inner and/or outer diameters, height, etc.) that facilitate the function and installation of the insert 840 described above.

Accordingly, exemplary embodiments discussed herein provide a combustor with enhanced performance and emission characteristics while maintaining acceptable component temperatures. In particular, the insert is secured to direct a jet of combustion air through both walls of a double wall liner while maintaining strain isolation between the walls. Additionally, passages are provided between the hot wall and the insert to generate a shroud of cooling air around the insert in a simple, cost effective manner. Reduced temperatures may improve overall combustor durability.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
   a first liner;
   a second liner forming a combustion chamber with the first liner, the combustion chamber configured to receive an air-fuel mixture for combustion therein;
   the first liner being a first double wall liner comprising a first wall forming a portion of the combustion chamber and a second wall extending around at least a portion of the first wall to form a liner cavity with the first wall, the first wall defining a first wall orifice and the second wall defining a second wall orifice, the second wall has a first side facing the liner cavity and a second side opposite the first side facing a combustor plenum; and
   a first insert mounted on the second wall within the second wall orifice and extending through the first wall orifice, the first insert configured to direct a first air jet through the second wall, through the first wall, and into the combustion chamber, the first insert formed by a tubular body portion extending through the first wall orifice and the second wall orifice, and a shoulder extending around the body portion that abuts the first side of the second wall,
   wherein the shoulder has a first diameter and the first wall orifice has a second diameter, greater than the first diameter.

2. The combustor of claim 1, wherein the first wall has a first side facing the combustion chamber and a second side facing the liner cavity, wherein the first insert further includes a flange circumscribing the body portion within the combustion chamber.

3. The combustor of claim 2, wherein the body portion is spaced apart from the first wall within the first wall orifice in a radial dimension to form an axial passage between the body portion and the first wall.

4. The combustor of claim 3, wherein the flange is spaced apart from the first side of the first wall in an axial dimension to form a radial passage between the flange and the first wall.

5. The combustor of claim 4, wherein the first insert is configured such that cooling air within the liner cavity flows through the axial passage and through the radial passage to provide a radiating flow of the cooling air around the insert within the combustion chamber.

6. The combustor of claim 5, wherein the flange is positioned on an end of the first insert.

7. The combustor of claim 1, wherein the first insert has a bell-mouth inlet portion arranged on the second side of the second wall within the combustor plenum.

8. The combustor of claim 7, wherein the bell-mouth inlet portion and the shoulder capture the second wall in between to prevent relative axial movement between the first insert and the second wall.

9. The combustor of claim 8, wherein the first insert is strain isolated relative to the first wall.

10. The combustor of claim 1, wherein the second wall is an impingement baffle with a plurality of impingement cooling holes.

11. The combustor of claim 10, wherein the first wall is an effusion panel with a plurality of effusion cooling holes.

12. A method for installing an insert in a first combustor liner, the insert configured to direct a first air jet through the second wall, through the first wall, and into the combustion chamber, the insert including an inlet portion, a tubular body portion, and a shoulder extending around the body portion, the first combustor liner being a first double wall liner comprising a first wall with a first side forming a portion of a combustion chamber and a second side facing a liner cavity and a second wall extending around at least a portion of the first wall and having a first side forming the liner cavity with the first wall and a second side facing a combustor plenum, the first wall defining a first wall orifice and the second wall defining a second wall orifice, a second combustor liner forming the combustion chamber with the first combustor liner, the combustion chamber configured to receive an air-fuel mixture for combustion therein, the method comprising the steps of:
    inserting the inlet portion through the first wall orifice from the first side of the first wall and then through the liner cavity and the second wall orifice of the second wall until the shoulder abuts the first side of the second wall and the body portion extends through the first wall orifice and the second wall orifice, the shoulder having a first diameter and the first wall orifice having a second diameter, greater than the first diameter; and
    deforming the inlet portion such that the inlet portion has an outer diameter greater than a diameter of the second wall orifice.

13. The method of claim 12, wherein the deforming step includes deforming the inlet portion such that the inlet portion and the shoulder capture the second wall to retain the insert relative to the second wall orifice.

14. The method of claim 12, further comprising the step of forming the body portion and the inlet portion as a single piece.

15. The method of claim 12, wherein the deforming step includes pressing a curvature into the inlet portion with a working tool.

16. The method of claim 12, wherein the insert further includes a flange circumscribing the body portion, and wherein the inserting includes inserting the inlet portion such that the flange is arranged within the combustion chamber and the body portion is spaced apart from the first wall within the first wall orifice in a radial dimension to form an axial passage between the body portion and the first wall and the flange is spaced apart from the first side of the first wall in an axial dimension to form a radial passage between the flange and the first wall.

17. The method of claim 16, wherein the flange is positioned on an end of the insert.

18. The method of claim 17, wherein the insert is strain isolated relative to the first wall.

* * * * *